(12) United States Patent
Jung et al.

(10) Patent No.: US 8,638,393 B2
(45) Date of Patent: Jan. 28, 2014

(54) APPARATUS AND METHOD FOR CONVERTING IMAGE IN AN IMAGE PROCESSING SYSTEM

(75) Inventors: Jae-Woo Jung, Cheonan-si (KR); Dae-Hee Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 488 days.

(21) Appl. No.: 12/645,798

(22) Filed: Dec. 23, 2009

(65) Prior Publication Data

US 2010/0157146 A1 Jun. 24, 2010

(30) Foreign Application Priority Data

Dec. 23, 2008 (KR) .................. 10-2008-0132476

(51) Int. Cl.
*H04N 7/01* (2006.01)
*H04N 11/20* (2006.01)

(52) U.S. Cl.
USPC ........................................ 348/446

(58) Field of Classification Search
USPC ................. 348/441–459, 558, 554
See application file for complete search history.

(56) References Cited

U.S. PATENT DOCUMENTS

| | | | |
|---|---|---|---|
| 5,742,343 A | 4/1998 | Haskell et al. | |
| 5,963,261 A | 10/1999 | Dean | |
| 6,760,376 B1 | 7/2004 | Dantwala | |
| 6,927,801 B2 | 8/2005 | Yugami et al. | |
| 7,362,374 B2 * | 4/2008 | Holt et al. | 348/446 |
| 2004/0174459 A1 | 9/2004 | Holt et al. | |
| 2006/0110072 A1 | 5/2006 | Domera-Venkata | |
| 2006/0215057 A1 | 9/2006 | Tanaka | |
| 2007/0070196 A1 * | 3/2007 | Caviedes et al. | 348/97 |
| 2007/0230918 A1 * | 10/2007 | Dalal et al. | 386/109 |
| 2008/0106506 A1 | 5/2008 | Doser et al. | |

FOREIGN PATENT DOCUMENTS

| | | |
|---|---|---|
| CN | 1832564 A | 9/2006 |
| CN | 1939063 A | 3/2007 |
| CN | 101103375 A | 1/2008 |
| EP | 0751682 A2 | 1/1997 |
| JP | 9247575 A | 9/1997 |
| JP | 2002-218348 A | 8/2002 |
| JP | 2003-69961 A | 3/2003 |
| JP | 2004-102963 A | 4/2004 |
| JP | 2004-513575 A | 4/2004 |
| JP | 2008-054221 A | 3/2008 |
| JP | 2008-524888 A | 7/2008 |
| KR | 10-1999-0028653 A | 4/1999 |
| WO | 97/41684 A1 | 11/1997 |
| WO | 02/37846 A1 | 5/2002 |

OTHER PUBLICATIONS

International Search Report for PCT/KR2009/007750 issued Jun. 23, 2010 [PCT/ISA/210].

Communication dated Dec. 18, 2012 issued by the Japanese Patent Office in counterpart Japanese Patent Application No. 2011-543428.

(Continued)

*Primary Examiner* — Michael Lee
(74) *Attorney, Agent, or Firm* — Sughrue Mion, PLLC (57) ABSTRACT

An image conversion apparatus and method for converting a progressive image into an interlaced image in an image processing system are provided. A controller determines a number of frames to be used to convert a progressive image into an interlaced image. A converter generates an interpolated image for the progressive image according to the determined number of frames, and converts the progressive image into an interlaced image using the interpolated image.

18 Claims, 6 Drawing Sheets

(56) References Cited

OTHER PUBLICATIONS

Communication dated May 21, 2013 issued by the Japanese Patent Office in counterpart Japanese Application No. 2011543428.
Communication dated May 27, 2013 issued by the State Intellectual Property Office of People's Republic of China in counterpart Chinese Application No. 200980151909.4.
Communication, dated Oct. 29, 2013, issued by the European Patent Office, in counterpart Application No. 09835287.5.
"HDTV Standard Conversion", Dong-Ho Lee, et al., Proceedings of the International Conference on Consumer Electronics, Jun. 8-10, 1993, p. 36-37.

* cited by examiner

APPARATUS AND METHOD FOR CONVERTING IMAGE IN AN IMAGE PROCESSING SYSTEM

CROSS REFERENCE TO RELATED APPLICATION

This application claims priority from Korean Patent Application No. 10-2008-0132476 filed Dec. 23, 2008 in the Korean Intellectual Property Office, the entire disclosure of which is hereby incorporated by reference.

BACKGROUND

1. Field

One or more embodiments relate generally to image processing, and more particularly, to an apparatus and method for converting a progressive image into an interlaced image in an image processing system.

2. Description of the Related Art

In general, a scheme of realizing a digital image is classified into an interlaced scheme and a progressive scheme according to a method of forming a frame.

The interlaced scheme forms one frame by realizing two fields in regular order line by line and then interlacing the two fields line by line. That is, the interlaced scheme scans only odd-numbered lines on one field (i.e., a top field) and only even-numbered lines on another field (i.e., a bottom field) and then realizes one frame using the two fields. Therefore, a height of each field is a half of the frame height in the interlaced scheme. The interlaced scheme is used to realize a screen of a high resolution of, for example, 1920*1280 even with a low frequency in a High-Definition Television (HD TV), but it suffers from significant screen flickering.

On the other hand, the progressive scheme forms one frame by scanning images in regular order line by line. The progressive scheme is used to realize a screen of a low resolution of, for example, 1280*720 in a computer monitor, a digital TV and the like, but undergoes less screen flickering compared to the interlaced scheme.

Therefore, an image processing system that processes both a progressive image scanned by the progressive scheme and an interlaced image scanned by the interlaced scheme according to the frame forming method, provides an apparatus and method for, upon receiving a progressive image, converting the progressive image into an interlaced image.

SUMMARY

One or more embodiments provide an image conversion apparatus and method for converting a progressive image into an interlaced image in an image processing system.

One or more embodiments also provide an image conversion apparatus and method for converting a low-resolution image into a high-resolution image in an image processing system.

One or more embodiments also provide an image conversion apparatus and method for converting a progressive image into an interlaced image to minimize pixel values of a residual image in an image processing system.

In accordance with an aspect of an exemplary embodiment, there is provided an image conversion method for converting a progressive image into an interlaced image in an image processing system, the method including determining a number of frames to be used to convert a progressive image into an interlaced image, generating an interpolated image for the progressive image according to the determined number of frames, and converting the progressive image into an interlaced image using the interpolated image.

In accordance with an aspect of another exemplary embodiment, there is provided an image conversion apparatus for converting a progressive image into an interlaced image in an image processing system, the apparatus including a controller which determines a number of frames to be used to convert a progressive image into an interlaced image, and a converter which generates an interpolated image for the progressive image according to the determined number of frames, and converts the progressive image into an interlaced image using the interpolated image.

BRIEF DESCRIPTION OF THE DRAWINGS

The above and other aspects will be more apparent from the following description of exemplary embodiments taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

While exemplary embodiments will be described with reference to a layered (or hierarchical) image processing system as an example of an image processing system that processes both a progressive image and an interlaced image, the inventive concept may be applied to all image processing systems that support both the progressive scheme and the interlaced scheme.

The layered image processing system is a system that outputs an original image in a low-resolution image and a high-resolution image, in which the low-resolution image may be scanned by the progressive scheme while the high-resolution image may be scanned by the interlaced scheme. Accordingly, when applied to the layered image processing system, the exemplary embodiments may convert the low-resolution image associated with the progressive image into the high-resolution image associated with the interlaced image.

Figure 1:
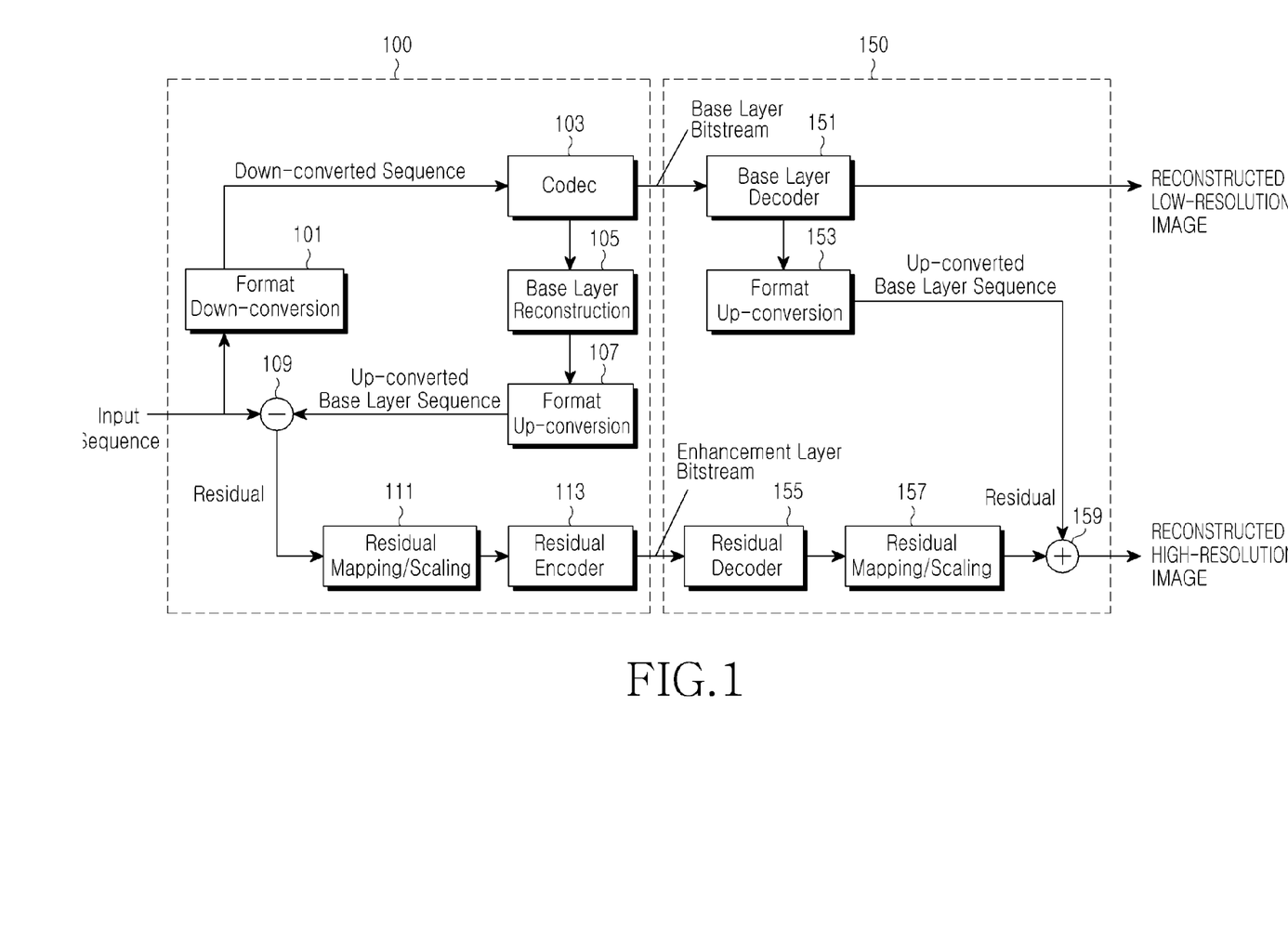
FIG. 1 is a schematic diagram showing architecture of a layered image processing system according to an exemplary embodiment.

FIG. 1 shows schematic architecture of a layered image processing system according to an exemplary embodiment.

The layered image processing system in FIG. 1 includes a layer encoding device 100 and a layer decoding device 150. Herein, an interlaced image is input to the layered image processing system as an original image.

When an original image is input to the layered image processing system as an input sequence or image, a format down-conversion unit 101 down-converts the input original image using the progressive scheme in order to convert the input original image into a low-resolution image, and then outputs the down-converted sequence or image to a codec 103. The down-converted sequence is a low-resolution image associated with a progressive image.

The codec 103 codes the low-resolution image associated with the progressive image to generate a bitstream associated with the progressive image. The bitstream associated with the progressive image is output to the layer decoding device 150. Further, the codec 103 decodes the coded bitstream associated with the progressive image and outputs the decoded bitstream to a base layer reconstruction unit 105. The low-resolution image associated with the progressive image is included in a base layer, and the codec 103 may use VC-1, H.264 or the like.

The base layer reconstruction unit 105 reconstructs the decoded bitstream associated with the low-resolution image associated with the progressive image using a predetermined condition.

A format up-conversion unit 107 up-converts the reconstructed bitstream associated with the progressive image using the interlaced scheme in order to convert the low-resolution image associated with the progressive image into a high-resolution image, and then outputs the up-converted base layer sequence or image to a subtraction unit 109. The up-converted base layer sequence is a high-resolution image associated with an interlaced image. That is, the format up-conversion unit 107 performs an operation for matching a resolution of the reconstructed progressive image to a resolution of the original image.

Based on previously transmitted header information, the format up-conversion unit 107 determines that the reconstructed low-resolution image associated with the progressive image is smaller in size than the high-resolution image associated with the interlaced image, and then converts the reconstructed low-resolution image associated with the progressive image into the high-resolution image associated with the interpolated and interlaced image.

The subtraction unit 109 calculates a residual between the input original image and the high-resolution image associated with the interlaced image.

A residual mapping/scaling unit 111 maps and scales the calculated residual to eight bits. A residual encoder 113 encodes the bits provided from the residual mapping/scaling unit 111, and outputs an enhancement layer bitstream to the layer decoding device 150.

In the layer decoding device 150, a base layer decoder 151 decodes the bitstream associated with the low-resolution image associated with the progressive image using VC-1, H.264 or the like, outputs the reconstructed low-resolution image associated with the progressive image to a format up-conversion unit 153, and outputs the reconstructed low-resolution image associated with the progressive image to a screen (not shown).

A residual decoder 155 in the layer decoding device 150 decodes the residual between the input original image and the high-resolution image associated with the interlaced image from the received enhancement layer bitstream.

The format up-conversion unit 153 up-converts the reconstructed low-resolution image associated with the progressive image and then outputs the high-resolution image associated with the interlaced image to an addition unit 159. Like the format up-conversion unit 107, the format up-conversion unit 153 determines, based on previously transmitted header information, that the reconstructed low-resolution image associated with the progressive image is smaller in size than the high-resolution image associated with the interlaced image, and then converts the reconstructed low-resolution image associated with the progressive image into the high-resolution image associated with the interpolated and interlaced image.

A residual mapping/scaling unit 157 maps and scales the decoded residual in an original bit depth, and outputs a residual for correcting the high-resolution image associated with the interlaced image provided from the format up-conversion unit 153, to the addition unit 159.

The addition unit 159 adds the interlaced image to the residual for correcting the interlaced image, and outputs the reconstructed interlaced image to the screen (not shown). The reconstructed interlaced image is included in an enhancement layer.

As in the above-described layered image processing system, in order to output the low-resolution image associated with the progressive image and the high-resolution image associated with the interlaced image to the screen, the format up-conversion units 107 and 153 should perform image conversion for converting the low-resolution image associated with the progressive image into the high-resolution image associated with the interlaced image.

In the layered image processing system, the layer encoding device 100 encodes the residual between the original image and the high-resolution image associated with the interlaced image converted from the low-resolution image associated with the progressive image, and outputs the encoded residual with the enhancement layer bitstream. In this case, as pixel values of a residual image which is the residual between the original image and the high-resolution image associated with the interlaced image are smaller, it is possible to minimize the residual during the encoding.

Accordingly, the present invention provides an image conversion apparatus and method capable of minimizing the pixel values of the residual image by the format up-conversion units 107 and 153 that perform image conversion from the progressive image into the interlaced image in the layered image processing system according to exemplary embodiments of the present invention.

Figure 2:
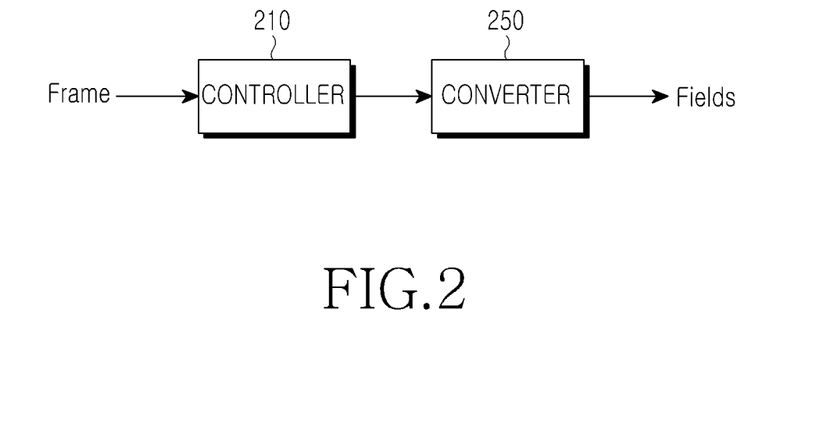
FIG. 2 is a schematic diagram showing a structure of an image conversion apparatus according to an exemplary embodiment.

FIG. 2 shows a schematic structure of an image conversion apparatus according to an exemplary embodiment.

Referring to FIG. 2, the image conversion apparatus includes a controller 210 and a converter 250 which convert a progressive image into an interlaced image.

The controller 210 determines the number of frames to be used to convert a progressive image into an interlaced image taking a characteristic of the original image into account, and outputs the determined number of frames to the converter 250. The characteristic of the original image may include at least one of motion and complexity. For example, if the original image has a small motion or is simple, the controller 210 determines to use one progressive image when converting the progressive image into the interlaced image. However, if the original image has a large motion or is complex, the controller 210 determines to use two progressive images when converting the progressive image into the interlaced image.

The converter 250 converts the progressive image into the interlaced image according to the number of frames, determined by the controller 210. That is, the converter 250 performs image conversion as shown in FIGS. 3A to 4B.

An exemplary case where the image conversion apparatus according to an exemplary embodiment is included in the layered image processing system is shown in FIGS. 3A to 5.

Figure 3A:
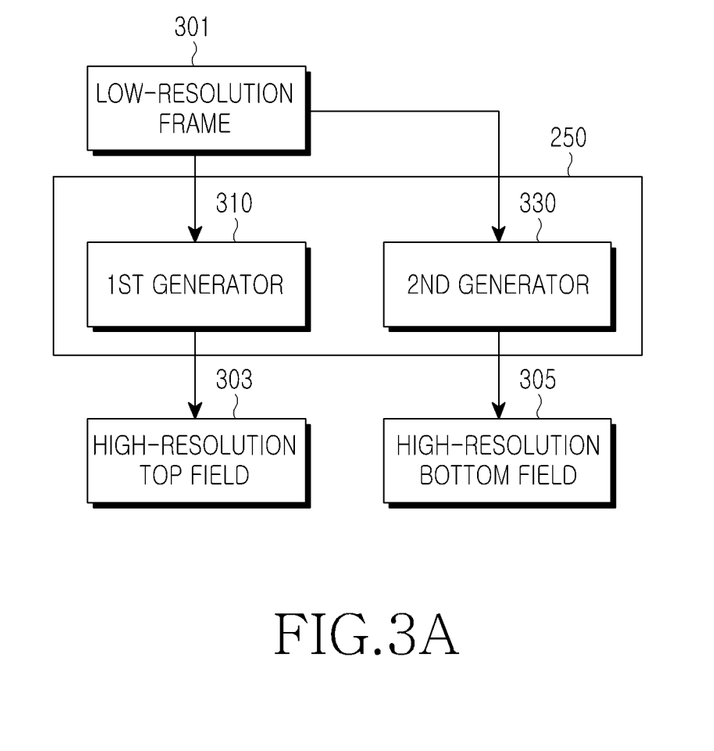
FIG. 3A is a schematic diagram showing a structure of an apparatus for converting an image using one low-resolution frame associated with a progressive image in a converter according to an exemplary embodiment.

FIG. 3A shows a schematic structure of an apparatus for converting an image using one progressive image based on the interlaced scheme in the converter 250 according to an exemplary embodiment.

Referring to FIG. 3A, the converter 250 includes a first generator 310 and a second generator 330. The first generator 310 and the second generator 330 may be constructed in one device.

If the number of frames determined by the controller 210 is one, the converter 250 converts a progressive image corresponding to a low-resolution frame 301 into interlaced images corresponding to high-resolution top and bottom fields 303 and 305 by means of the first generator 310 and the second generator 330.

The converter 250 will be described in detail. Based on previously transmitted header information, the first generator 310 and the second generator 330 determine that the progressive image corresponding to the low-resolution frame 301 is smaller in size than the interlaced images corresponding to the high-resolution top and bottom fields 303 and 305, and then generate an interpolated image by performing interpolation on the progressive image corresponding to the low-resolution frame 301. The interpolated image may be equal to or different from the interlaced images corresponding to the high-resolution top and bottom fields 303 and 305 in terms of the size.

The first generator 310 interpolates the low-resolution frame 301, and generates an interlaced image corresponding to the high-resolution top field 303 using the interpolated image. The second generator 330 interpolates the low-resolution frame 301, and generates an interlaced image corresponding to the high-resolution bottom field 305 using the interpolated image. That is, the first generator 310 and the second generator 330 generate interlaced images corresponding to the high-resolution top and bottom fields 303 and 305 by converting the progressive image corresponding to the low-resolution frame 301 into an interlaced image.

The low-resolution frame 301 and the high-resolution top field 303 correspond to the same time $T_1$, and the high-resolution bottom field 305 corresponds to $T_1'$ which is between $T_1$ of the low-resolution frame 301 and $T_2$ of the next received low-resolution frame. Here, T denotes a display time. Unlike in FIG. 3A, the low-resolution frame 301 and the high-resolution bottom field 305 may correspond to the same time $T_1$, and the high-resolution top field 303 may correspond to $T_1'$ which is between $T_1$ of the low-resolution frame 301 and $T_2$ of the next received low-resolution frame.

Figure 3B:
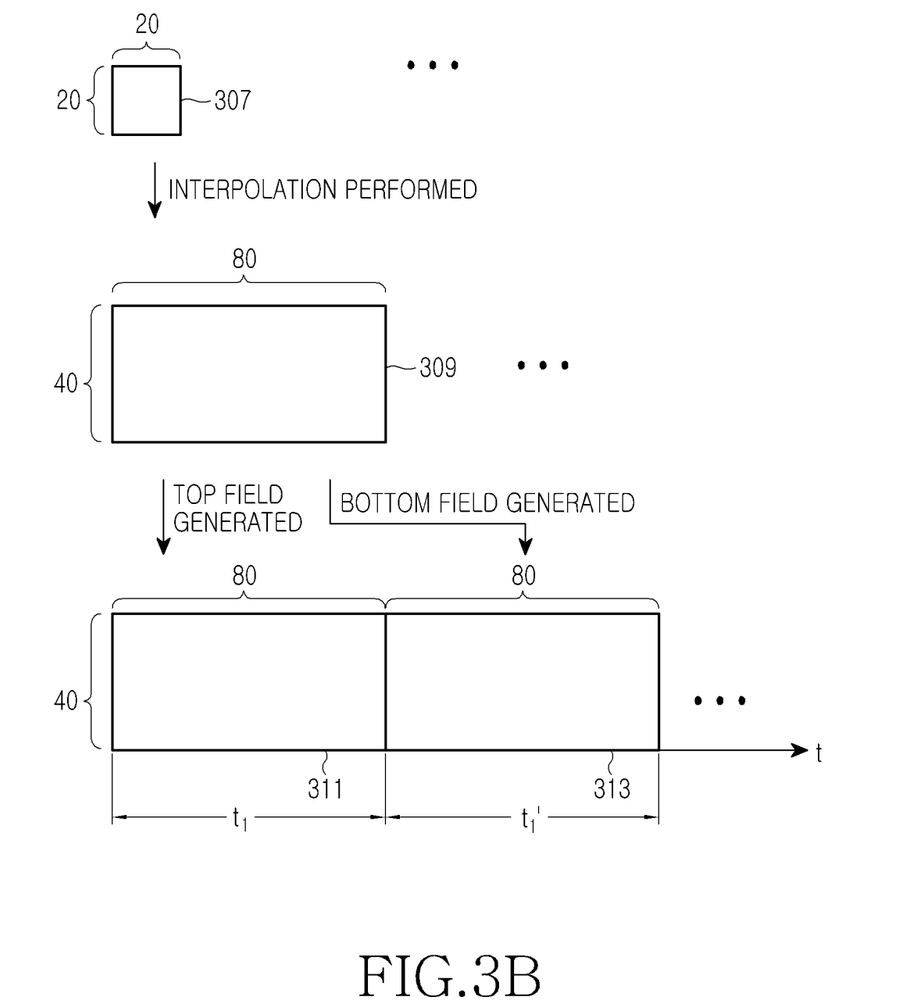
FIG. 3B is a diagram showing an example of a method for converting an image using one low-resolution frame associated with a progressive image in a converter according to an exemplary embodiment.

That is, as shown in FIG. 3B, the converter 250 according to an exemplary embodiment may convert an image using one progressive image.

Referring to FIG. 3B, if a progressive image corresponding to a 20*20 low-resolution frame 307 is input to the converter 250, the first generator 310 and the second generator 330 generate a 40*80 interpolated image 309 using the progressive image corresponding to the low-resolution frame 307. It is characterized that the interpolated image 309 is neither a progressive image nor an interlaced image.

The first generator 310 generates a 40*80 interlaced image corresponding to a high-resolution top field 311 using the interpolated image 309, and the second generator 330 generates a 40*80 interlaced image corresponding to a high-resolution bottom field 313 using the interpolated image 309. That is, for example, the first generator 310 generates a 40*80 interlaced image corresponding to the high-resolution top field 311 by copying or filtering the interpolated image 309, and generates the second generator 330 generates a 40*80 interlaced image corresponding to the high-resolution bottom field 313 by filtering the interpolated image 309.

The low-resolution frame 307 and the high-resolution top field 311 correspond to the same time $T_1$, and the high-resolution bottom field 313 corresponds to $T_1'$ which is between $T_1$ of the low-resolution frame 307 and $T_2$ of the next received low-resolution frame.

Figure 4A:
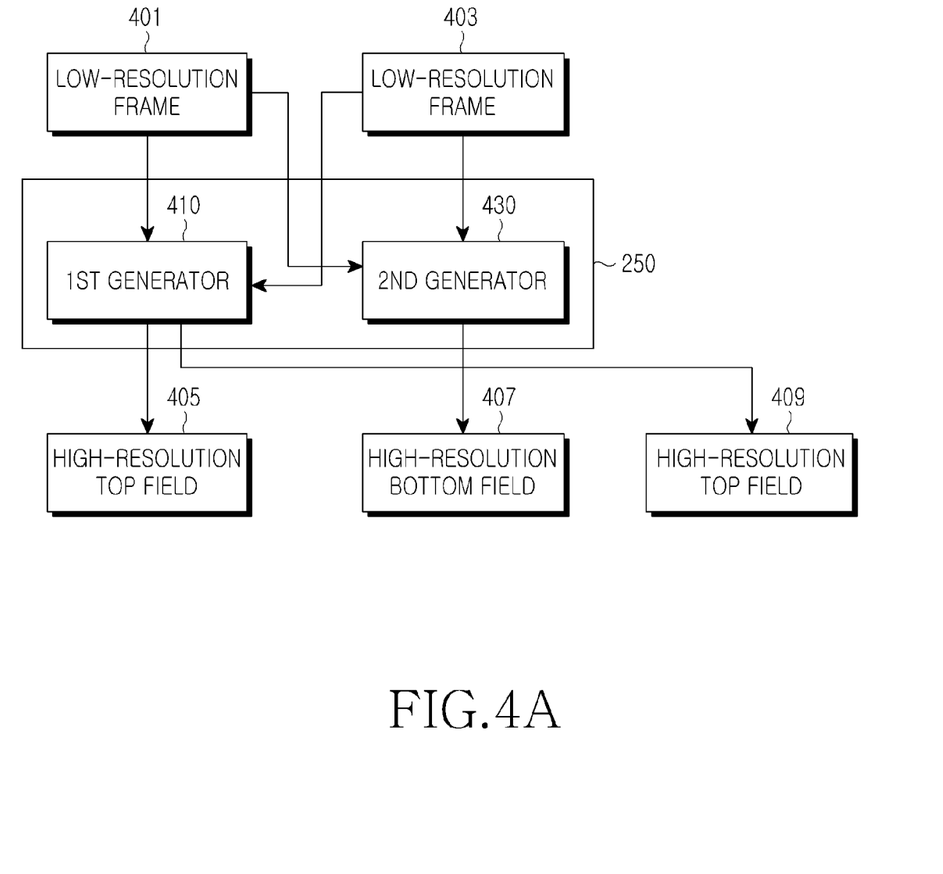
FIG. 4A is a schematic diagram showing a structure of an apparatus for converting an image using two low-resolution frames associated with a progressive image in a converter according to an exemplary embodiment.

FIG. 4A shows a schematic structure of an apparatus for converting an image using two progressive images based on the interlaced scheme in the converter 250 according to an exemplary embodiment.

Referring to FIG. 4A, the converter 250 includes a first generator 410 and a second generator 430. The first generator 410 and the second generator 430 may be constructed in one device.

If the number of frames determined by the controller 210 is two, the first generator 410 and the second generator 430 convert progressive images corresponding to first and second low-resolution frames 401 and 403 into interlaced images corresponding to high-resolution fields 405, 407 and 409.

The converter 250 will be described in detail. Based on previously transmitted header information, the first generator 410 and the second generator 430 determine that the progressive images corresponding to the first and second low-resolution frames 401 and 403 are smaller in size than the interlaced images corresponding to the high-resolution fields 405, 407 and 409, and then generate interpolated images by performing interpolation on the progressive images corresponding to the first and second low-resolution frames 401 and 403, respectively. The interpolated images may be equal to or different from the interlaced images corresponding to the high-resolution fields 405, 407 and 409 in terms of the size.

The first generator 410 interpolates the first low-resolution frame 401, and generates an interlaced image corresponding to the first high-resolution top field 405 using the interpolated image for the progressive image corresponding to the first low-resolution frame 401. Further, the first generator 410 interpolates the second low-resolution frame 403, and generates an interlaced image corresponding to the second high-resolution top field 409 using the interpolated image for the progressive image corresponding to the second low-resolution frame 403.

The second generator 430 generates an interlaced image corresponding to the high-resolution bottom field 407 taking into account both the interpolated image for the progressive image corresponding to the first low-resolution frame 401 and the interpolated image for the progressive image corresponding to the second low-resolution frame 403. The interlaced image corresponding to the first high-resolution top field 405 and the progressive image corresponding to the first low-resolution frame 401 correspond to the same time $T_1$, the interlaced image corresponding to the second high-resolution top field 409 and the progressive image corresponding to the second low-resolution frame 403 correspond to the same time $T_2$, and the interlaced image corresponding to the high-resolution bottom field 407 corresponds to a time $T_1'$ which is between $T_1$ of the progressive image corresponding to the first low-resolution frame 401 and $T_2$ of the progressive image corresponding to the second low-resolution frame 403.

Unlike in FIG. 4A, the interlaced image corresponding to the first high-resolution top field 405 and the progressive image corresponding to the first low-resolution frame 401 may correspond to the same time $T_1$, the interlaced image corresponding to the high-resolution bottom field 407 and the progressive image corresponding to the second low-resolution frame 403 may correspond to the same time $T_2$, and the interlaced image corresponding to the second high-resolution top field 409 may correspond to $T_1'$ which is between $T_1$ of the progressive image corresponding to the first low-resolution frame 401 and $T_2$ of the progressive image corresponding to the second low-resolution frame 403.

Therefore, the first generator 410 and the second generator 430 according to an exemplary embodiment generate an interlaced image corresponding to a high-resolution bottom field 421 taking into account both the progressive images corresponding to the first and second low-resolution frames 401 and 403, thereby effectively expressing a characteristic (e.g., motion) of the original image.

In addition, the first generator 410 and the second generator 430 simultaneously perform interpolation and conversion into interlaced images on the progressive images, thereby minimizing a pixel value of a residual image and thus increasing a compression efficiency of the image processing system.

Figure 4B:
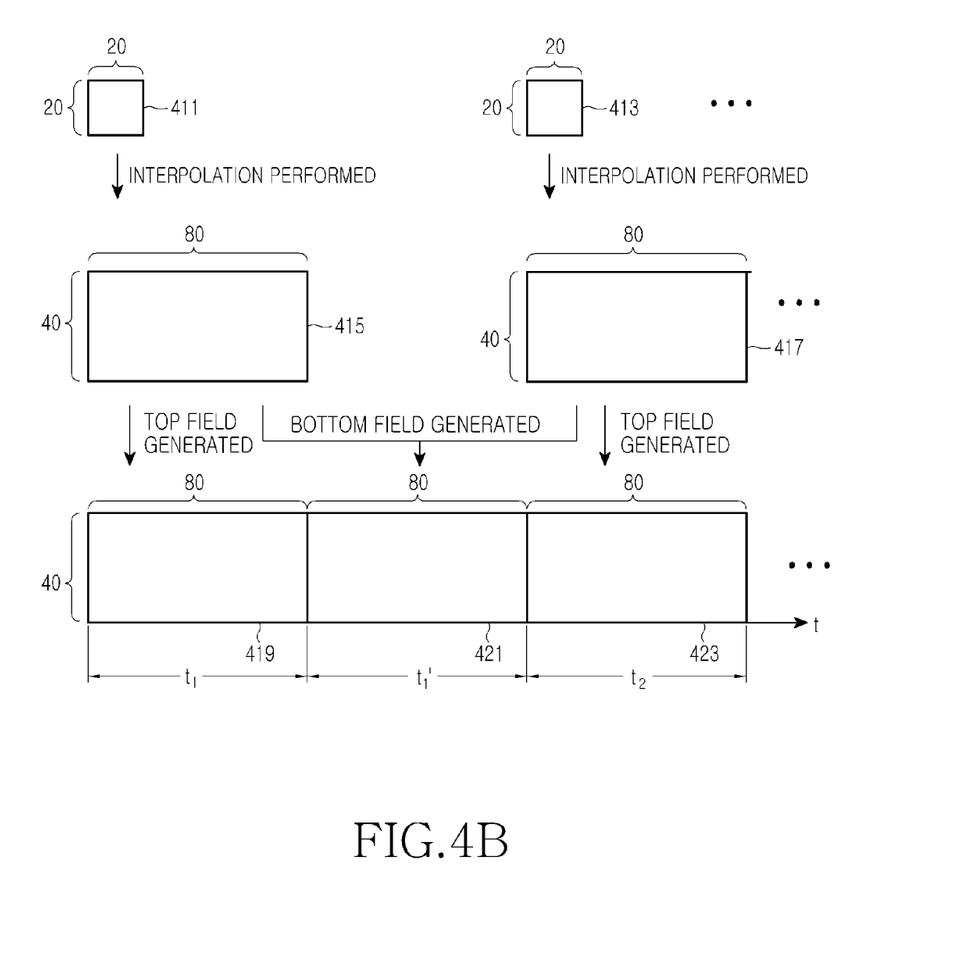
FIG. 4B is a diagram showing an example of a method for converting an image using two low-resolution frames associated with a progressive image in a converter according to an exemplary embodiment.

FIG. 4B shows an exemplary method of converting an image using two progressive images in the apparatus shown in FIG. 4A.

Referring to FIG. 4B, if progressive images corresponding to 20*20 low-resolution frames 411 and 413 are input to the converter 250, the first generator 410 and the second generator 430 generate a 40*80 interpolated image 415 for the progressive image corresponding to the low-resolution frame 411 and a 40*80 interpolated image 417 for the progressive image corresponding to the low-resolution frame 413, respectively. In addition, the first generator 410 generates a 40*80 interlaced image corresponding to a high-resolution top field 419 using the interpolated image 415, and generates a 40*80 interlaced image corresponding to a high-resolution top field 423 using the interpolated image 417. The second generator 430 generates a 40*80 interlaced image corresponding to a high-resolution bottom field 421 using the interpolated images 415 and 417.

That is, for example, the first generator 410 generates a 40*80 interlaced image corresponding to the high-resolution top field 419 by copying or filtering the interpolated image 415, and generates a 40*80 interlaced image corresponding to the high-resolution top field 423 by copying or filtering the interpolated image 417. The second generator 430 generates a 40*80 interlaced image corresponding to the high-resolution bottom field 421 by filtering the interpolated images 415 and 417.

The low-resolution frame 411 and the high-resolution top field 419 correspond to the same time $T_1$, the low-resolution frame 413 and the high-resolution top field 423 correspond to the same time $T_2$, and the high-resolution bottom field 421 corresponds to $T_1'$ which is between $T_1$ of the low-resolution frame 411 and $T_2$ of the low-resolution frame 413.

Figure 5:
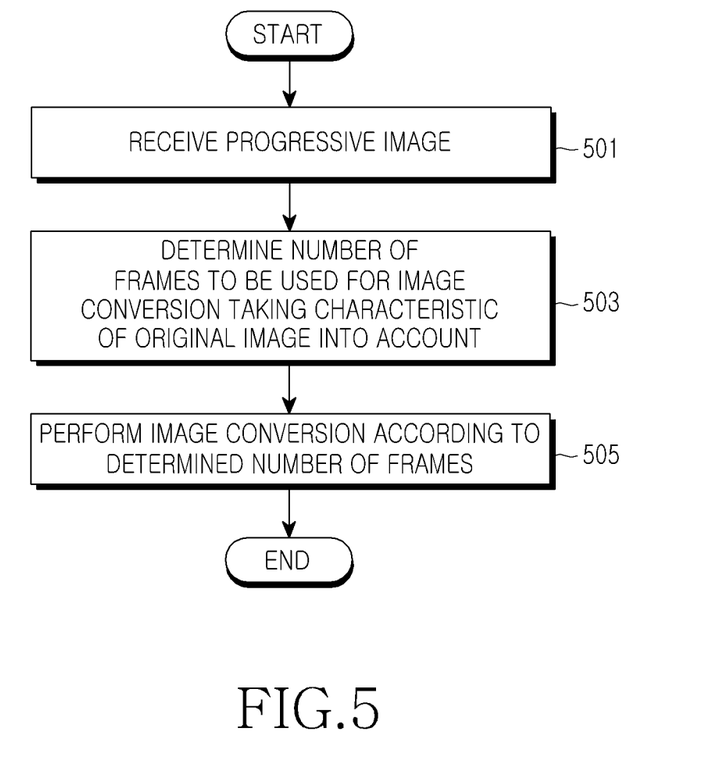
FIG. 5 is a flowchart showing a method for converting an image according to an exemplary embodiment.

FIG. 5 shows a method for converting an image according to an exemplary embodiment.

Referring to FIG. 5, if a progressive image is received in operation 501, the controller 210 determines the number of frames to be used to convert the progressive image into an interlaced image according to a characteristic of an original image in operation 503. For example, in operation 503, if the original image has a small motion or is simple, the controller 210 determines that one low-resolution frame associated with the progressive image is to be used when converting the progressive image into an interlaced image. However, if the original image has a large motion or is complex, the controller 210 determines that two low-resolution frames associated with the progressive image are to be used when converting the progressive image into an interlaced image.

In operation 505, the converter 250 converts a progressive image corresponding to each of the determined number of frames into interlaced images corresponding to multiple fields. This process of converting progressive images into interlaced images has been described with reference to FIGS. 3A to 4B.

As is apparent from the foregoing description, exemplary embodiments generate interlaced images corresponding to high-resolution fields using progressive images corresponding to multiple low-resolution frames, thereby effectively expressing a characteristic (e.g., motion) of the original image.

In addition, the exemplary embodiments simultaneously perform interpolation and conversion into interlaced images on the progressive images, thereby minimizing a pixel value of a residual image and thus increasing a compression efficiency of the image processing system.

While certain exemplary embodiments have been shown and described, it will be understood by those skilled in the art that various changes in form and details may be made therein without departing from the spirit and scope of the invention as defined by the appended claims and their equivalents.

What is claimed is:

1. An image conversion method comprising:
    determining a number of frames to be used to convert a progressive image into an interlaced image;
    generating an interpolated image for the progressive image according to the determined number of frames; and
    converting the progressive image into an interlaced image using the interpolated image,
    wherein the determined number of frames is two,
    wherein the generating comprises:
        generating a first interpolated image for a first progressive image corresponding to a first frame, and
        generating a second interpolated image for a second progressive image corresponding to a second frame, and
    wherein the converting comprises:
        generating first and second interlaced images corresponding to first and second top fields, respectively, using the first and second interpolated images corresponding to the first and second frames, and
        generating a third interlaced image corresponding to a bottom field using the first and second interpolated images corresponding to the first and second frames.

2. The image conversion method of claim 1, wherein the converting comprises converting a progressive image corresponding to each of the determined number of frames into interlaced images corresponding to multiple fields.

3. The image conversion method of claim 1, wherein the generating comprises generating an interpolated image for a progressive image corresponding to one frame, and
    wherein the converting comprises converting the progressive image into interlaced images corresponding to multiple fields using the interpolated image corresponding to each of the determined number of frames.

4. The image conversion method of claim 1, wherein the number of frames is determined according to a characteristic of an original image.

5. The image conversion method of claim 4, wherein the characteristic of the original image includes at least one of motion and complexity of the original image.

6. The image conversion method of claim 2, wherein the multiple fields include a top field and a bottom field.

7. The image conversion method of claim 6, wherein an arbitrary field, which is one of the top field and the bottom field, is placed in a same time as that of a corresponding frame, and a remaining field except for the arbitrary field is placed in a different time from that of the corresponding frame.

8. The image conversion method of claim 3, wherein the generating the interpolated image for the progressive image and the converting the progressive image into the interlaced image are performed simultaneously.

9. The image conversion method of claim 8, wherein an arbitrary field, which is any one of a top field and a bottom field, is placed in a same time as that of one corresponding frame, and the remaining field except for the arbitrary field is placed in a different time from that of the corresponding frame.

10. An image conversion apparatus comprising:
   a controller which determines a number of frames to be used to convert a progressive image into an interlaced image; and
   a converter which generates an interpolated image for the progressive image according to the determined number of frames, and converts the progressive image into an interlaced image using the interpolated image,
   wherein if the determined number of frames is two, the converter generates a first interpolated image for a first progressive image corresponding to a first frame, generates a second interpolated image for a second progressive image corresponding to a second frame, generates first and second interlaced images corresponding to first and second top fields, respectively, using the first and second interpolated images corresponding to the first and second frames, and an generates a third interlaced image corresponding to a bottom field using the first and second interpolated images corresponding to the first and second frames.

11. The image conversion apparatus of claim 10, wherein the converter converts a progressive image corresponding to each of the determined number of frames into interlaced images corresponding to multiple fields.

12. The image conversion apparatus of claim 10, wherein the converter generates an interpolated image for a progressive image corresponding to one frame, and converts the progressive image into interlaced images corresponding to multiple fields using an interpolated image corresponding to each of the determined number of frames.

13. The image conversion apparatus of claim 10, wherein the number of frames is determined according to a characteristic of an original image.

14. The image conversion apparatus of claim 13, wherein the characteristic of the original image includes at least one of motion and complexity of the original image.

15. The image conversion apparatus of claim 11, wherein the multiple fields include a top field and a bottom field.

16. The image conversion apparatus of claim 15, wherein an arbitrary field, which is any one of the top field and the bottom field, is placed in a same time as that of one corresponding frame, and the remaining field except for the arbitrary field is placed in a different time from that of the corresponding frame.

17. The image conversion apparatus of claim 12, wherein the converter simultaneously performs the generation of an interpolated image for a progressive image and the conversion of the progressive image into an interlaced image.

18. The image conversion apparatus of claim 17, wherein an arbitrary field, which is any one of a top field and a bottom field, is placed in a same time as that of one corresponding frame, and the remaining field except for the arbitrary field is placed in a different time from that of the corresponding frame.

* * * * *